Oct. 2, 1928.　　　　　　　　　　　　　　　　　　　　1,686,081

J. FRIEDMAN

STRAW HAT

Filed Nov. 26, 1927

INVENTOR.
Jacob Friedman
BY John E. Prager
ATTORNEY

Patented Oct. 2, 1928.

1,686,081

UNITED STATES PATENT OFFICE.

JACOB FRIEDMAN, OF BROOKLYN, NEW YORK.

STRAW HAT.

Application filed November 26, 1927. Serial No. 235,776.

This invention relates generally to straw hats and more particularly to the stiff sailor type.

An object of my invention is to provide a hat of this type with a head-conforming pliant portion between the crown and brim portion whereby the hat will conform to, and comfortably fit the head of the wearer at all times, notwithstanding it may have been wet, without the necessity for blocking or reshaping.

Another object of this invention is to provide a head-conforming portion between the crown and brim of a straw hat which will not lose the cushioning effect thereof, nor become larger around the head by reason of continuous wear.

Another object of the invention is to provide a head-conforming portion between the crown and brim of a straw hat composed of the same type of straw braid as the main portions of the brim and crown, presenting a uniform and neat appearance, the cushioning agent being entirely invisible.

Another object of the invention is to provide a hat of the character described which can be made without any additional labor, the cushioning agent being applied and secured to the overlapped edges of two adjacent braids during attachment of the adjacent edges.

Heretofore in the art, straw hats have been manufactured with the major portions of the brim and the upper portion of the crown, glued to secure the necessary stiffness of the hat, having an unglued portion adjacent the juncture of the brim and crown, to secure flexibility of that portion. This type of construction permits sagging during damp weather and remains so after drying. While the unglued portions of this type of hat possess considerable elasticity, there is a tendency to stretch and become larger around the head during use.

Straw hats have also been made of wholly different braid of greater elasticity than the main portions of the hat, or a composite braid similar to the brim and crown, separated by a wide braid of great elasticity, between the main portion of the brim and crown at the point where it presses against the head of the wearer. In the popular type of sailor hat made of the heavy saw-tooth braid, these inserts of different texture are objectionable, due to marring of the appearance.

Other objects and advantages will appear in the following description reference being made to the accompanying drawing, wherein I have illustrated one embodiment of my invention in which, Figure 1 is a section on line 1—1 of Figure 2, Figure 2 is an enlarged fragmentary section on the line 2—2 of Figure 1 of the completed brim, Figure 3 is an enlarged developed detail of the preferred embodiment, Figure 4 is a view similar to Figure 3 of a modification.

Referring to the drawing, like numerals indicate the same or similar parts in the different figures, wherein 10 designates the inner portion of the brim wherein my invention consists. The outer brim portion 11 comprises an upper layer $11^a$ and an under layer $11^b$ of braid, having one serrated edge $c$ and one smooth edge $d$, spirally arranged with the serrated edges overlapping the smooth edges, and extending upwardly, leaving the serrated edges $c$ visible, and stitched in the usual manner, by stitches 13 disposed at acute lateral angles one to another, thus forming a resilient seam. The crown portion 14 is helically formed of the same braid as the brim portion 11 with the serrated edges extending downwardly.

The intermediate portion 10, which is interposed and stitched to the crown and brim portions, is composed of an upper layer $10^a$ and an under layer $10^b$ and are formed of the same braid as the crown and brim portions, having one serrated edge $c'$ and one smooth edge $d'$ spirally arranged with the smooth edges overlapping the serrated edges. The smooth edges extend outwardly to facilitate the bending at 12, leaving a smoother finish than would occur if the outer brim were extended and bent at 12. The intermediate portions $10^a$ and $10^b$ are composed of a single braid of the type aforementioned, and a cloth covered elastic 16 is superposed on the overlap of adjacent braids and stitched together therewith. The elastic band 16 is stretched during the stitching and forms a spiral which has a tendency to draw the braids of the intermediate portion inwardly, thereby permitting a considerable expansion in the opposite direction and giving a maximum cushioning effect to the head. The intermediate portion of the hat 10 is unglued.

It is obvious from the construction that when the hat is wet by rain, it is only necessary to place the brim on a flat surface to dry, thereby regaining its original shape and cushioning effect.

The elastic bands are invisible being stitched on the inner surfaces of the layers $10^a$ and $10^b$.

In Figure 4, I have shown a modification of my embodiment wherein I employ a flat cloth-covered elastic band 17, which is stitched between two adjacent overlapped braids of the intermediate portion 10. This band 17 is also stretched and stitched by the same stitch 18 that joins the overlapping edges of the braid.

Having thus illustrated and described the preferred and modified form of my invention, it being understood that such changes and variation may be made without departing from the spirit and scope thereof, as clearly defined in the appended claims, what I wish to secure by Letters Patent is:

1. A braided straw hat having a crown, a two-ply brim spaced circumjacent the crown, an intervening two-ply element composed of a series of unstiffened braid coils, a covered elastic band wound spirally between the upper and lower intervening braid coils at the juncture of the coils, and rows of stitches retaining the braid coils and elastic band in such manner as to permit limited relative movement of the coils.

2. A braided straw hat having a crown, a two-ply brim spaced circumjacent the crown, an intervening two-ply element composed of a series of unstiffened braid coils, stitches disposed at acute angles connecting said coils, and a tensioned round rubber band enclosed in a fabric casing disposed interjacent the plies of the intervening element at their overlapping portions to be engaged by said angular stitches.

Signed at New York, in the county of New York and State of New York, this 23rd day of November, A. D. 1927.

JACOB FRIEDMAN.